United States Patent [19]

Noguchi

[11] 4,243,294
[45] Jan. 6, 1981

[54] METHOD AND APPARATUS FOR GENERATING SYNCHRONIZING SIGNAL FOR A BEAM SCANNER

[75] Inventor: Masaru Noguchi, Asaka, Japan

[73] Assignee: Fuji Photo Film Co., Ltd., Minami-ashigara, Japan

[21] Appl. No.: 811,222

[22] Filed: Jun. 29, 1977

[30] Foreign Application Priority Data

Jul. 1, 1976 [JP] Japan ............................ 51/77018

[51] Int. Cl.³ ............................................. G02B 27/17
[52] U.S. Cl. ........................................ 350/6.8; 358/295
[58] Field of Search ............................ 350/6, 7, DIG. 2; 250/350–351, 216, 236; 358/199, 175; 340/146.3 F, 146.1 D; 356/201, 246

[56] References Cited

U.S. PATENT DOCUMENTS

| | | | |
|---|---|---|---|
| 3,835,249 | 9/1974 | Dattilo et al. | 350/7 |
| 3,844,661 | 10/1974 | Birkett et al. | 356/201 |
| 3,848,087 | 11/1974 | Carrell | 350/6.8 |
| 3,869,193 | 3/1975 | Schmit | 350/6 |
| 3,893,079 | 7/1975 | Shepard et al. | 350/6 |
| 3,928,759 | 12/1975 | Sansome | 350/6 |
| 3,972,582 | 8/1976 | Oosaka et al. | 350/7 |

OTHER PUBLICATIONS

Jablonowski et al., Galvanometer Deflection: A Precision High Speed System, Jun. 1976, vol. 15, No. 6, Applied Optics, pp. 1437–1443.

*Primary Examiner*—John K. Corbin
*Assistant Examiner*—B. W. de los Reyes
*Attorney, Agent, or Firm*—Sughrue, Rothwell, Mion, Zinn and Macpeak

[57] ABSTRACT

Synchronizing signals for a laser beam scanner are generated by applying first and second angularly spaced light beams 100, 200 to the same reflecting surface 11 of a rotary, multi-surfaced mirror 10. When the first reflected light beam 110' is close to the start point 111 of the line 130, the second reflected light beam 210 is focused onto a photo-detector 30 whose output constitutes the synchronizing signal for the scan. Since both input beams 100, 200 are incident on the same mirror surface rather than impinging an edge thereof, jitter due to angle division errors, rotational speed fluctuations, and mechanical vibrations is eliminated.

8 Claims, 2 Drawing Figures

METHOD AND APPARATUS FOR GENERATING SYNCHRONIZING SIGNAL FOR A BEAM SCANNER

BACKGROUND OF THE INVENTION

This invention relates to an improved synchronizing signal generator for a light beam scanner utilizing a rotary, multi-surfaced mirror, in which scanning direction jitter caused by mirror manufacturing errors, fluctuations in the mirror rotation, and mechanical vibrations is eliminated.

Devices for reading and recording information by using a laser light beam have been recently developed. In these devices a laser light scanning deflector is an essential element, which may take the form of an electro-optical or acousto-optical device, a vibrating galvanometer mirror, or a rotary, multi-surfaced mirror. The latter is particularly advantageous in that it has a large deflection angle and high resolution, and has no spectral characteristics. However, such a rotary, multi-surfaced mirror suffers from the drawback that the position of the start point of the laser scanning beam fluctuates or "jitters" because of angle division errors in manufacturing the mirror, variations in the rotational speed of the driving motor, etc, and the scanning is thus not always repeated at accurate time intervals.

To describe the angle division error, assume that a 24-surfaced mirror is employed and that 80% of the total scanning line width is utilized in the actual scan with a resolution of 1,500 dots or bits. The rotation angle of the mirror per dot is thus $360°/24 \times 0.8 \times 1/1500 = 0.008° = 28.8''$. Accordingly, if there is an error of more than 28.8'' between adjacent mirror surfaces, a displacement of more than 1 dot is caused in the scanning direction between adjacent scan lines. Where the scanned image must have a high degree of resolution, a displacement of 1 dot destroys the image quality. The displacement must therefore be less than a fraction of 1 dot, and accordingly the angle division error must be less than several seconds. The manufacture of such a multi-surfaced mirror with high accuracy requires very sophisticated techniques, however, and is therefore very expensive.

With respect to the rotational speed of the motor, if a 24-surfaced mirror is revolved at 3,600 r.p.m., the scanning frequency is 1.44 KHz, and accordingly the period of time necessary for one scan line is 694.4 μs. Since only 80% of the line width is utilized, the effective scanning time per dot or bit is $555.6 \mu s/1,500 = 0.37 \mu s$. Rotational speed variations of the motor higher than 1 KHz are never encountered, and therefore the variation is one scan line, or during a period of 694.4 μs, is so small that it can be neglected. However, any small speed variations are cumulative and result in a large low frequency variation from several Hz to several tens of Hz, and the measurement of this variation results in a time error of more than several μs with respect to an ideally constant rotational speed. If such an error is produced, since the time necessary to scan a space corresponding to 1 dot is only about 0.37 μs, a positional displacement of approximately fifteen or sixteen dots is caused with respect to the ideal image. Accordingly, in order to maintain the rotational speed variation at less than 1 dot, it is necessary to employ a high performance electric motor with an intricate feedback control.

Thus, there has been a strong demand to eliminate jitter in the scan line direction without improving the manufacturing accuracy of the multi-surfaced mirror or the rotational accuracy of the drive motor. To satisfy such demand, new methods are disclosed in Japanese Patent Publication (OPI) Nos. 40141/1976 and 89750/1976. In these methods a scan line is formed by deflecting a light beam with a rotary, multi-surfaced mirror, and a photo-detector is disposed in the light beam path in the vicinity of the start point of the line. The output of the photo-detector is employed as a synchronizing signal, and the light beam is modulated with information to be recorded a predetermined period of time after the production of the synchronizing signal, thereby starting the effective scan line at a predetermined position to eliminate jitter.

Such a method will be described with reference to FIG. 1, which is a schematic diagram illustrating a conventional optical system for generating synchronizing signals.

A light beam 100 applied to one surface 11 of a rotary mirror 10 is reflected in the direction of the arrow 14 as the mirror is rotated about the shaft 12 in the direction of the arrow 13. It is assumed that the deflected light beam is within an effective recording range when it is between a start beam 110 and a finish beam 120, and the beam thus provides an effective scan line 130 having a start point 111 and a finish point 121 on the film or image plane through a focusing lens 20. When the light beam is reflected by the mirror at a beam position 110', immediately before it starts its effective or recording deflection, the beam 110' passes through the lens 20 and forms a light spot 111' in the vicinity of the start point of the effective scan line, as shown in FIG. 1.

A photo-detector 30 is disposed in the path of the beam 110' at the position of the light spot 111' to thereby detect the light beam, and the output of the photo-detector is employed as a synchronizing signal. If, at a suitably predetermined time immediately after the end of the synchronizing signal the effective scan is started by modulating the light beam with information, the effective scan line starts at position 111 at all times, and jitter in the scanning direction is therefore eliminated.

The above-described method is somewhat effective, but still suffers from several drawbacks. In general, the light beam applied to the reflection mirror surfaces should have a finite width with respect to the direction of revolution. When the light beam is at the end of the deflection range, it is incident on the edge between adjacent mirror surfaces. If the deflection range is terminated before the light beam reaches the above-mentioned edge, then the effective scan width is decreased. If, when the light beam reaches the edge its power loss is less than 10-20%, this is generally regarded as the effective deflection range.

The use of an effective deflection range as wide as possible is strongly desirable where the diameter of the light beam incident on the mirror is increased to improve the image resolution or where the size of the mirror is reduced to increase the scanning rate. The light beam 110' applied to the photo-detector 30 after being reflected by the edge between adjacent mirror surfaces, and the light spot 111' formed thereby, are often irregular, however, because of the diffraction caused by the edge. This irregularity varies between adjacent mirror surface edges due to fluctuations in the edges caused by mirror manufacturing errors; that is, different irregularities appear for different mirror surface edges. Accordingly, synchronizing signals generated by the conventional apparatus shown in FIG. 1 tend to fluctuate with variations in the light beam 110' and the light spot 111', and the trailing edge of the output signal from the photo-detector 30 does not always correspond to the predetermined position of the beam 110' or the spot 111', which results in erroneous synchronizing signals.

SUMMARY OF THE INVENTION

Accordingly, an object of this invention is to provide an improved synchronizing signal generator for a light beam scanner utilizing a rotary, multi-surfaced mirror, in which all of the above-described difficulties accompanying the conventional techniques have been overcome and wherein jitter in the scanning direction caused by mirror manufacturing errors, variations in rotational speed, and mechanical vibrations, has been eliminated.

The foregoing and other objects of the invention are achieved by providing two angularly displaced light beams incident on the same reflecting mirror surface, a first beam for forming a scan line and a second beam for generating a synchronizing signal. The two beams are oriented such that when the first beam is reflected to the vicinity of the start point of the scan line, the second beam is reflected by the same mirror surface and applied to a photo-detector disposed at a predetermined position, to thus generate an accurately timed synchronizing signal.

DETAILED DESCRIPTION OF THE INVENTION

Figure 1:
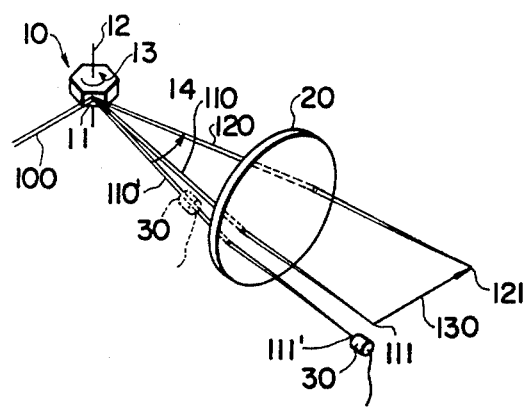
FIG. 1 shows a schematic perspective view of a conventional synchronizing signal generator for a light beam scanner.
Figure 2:
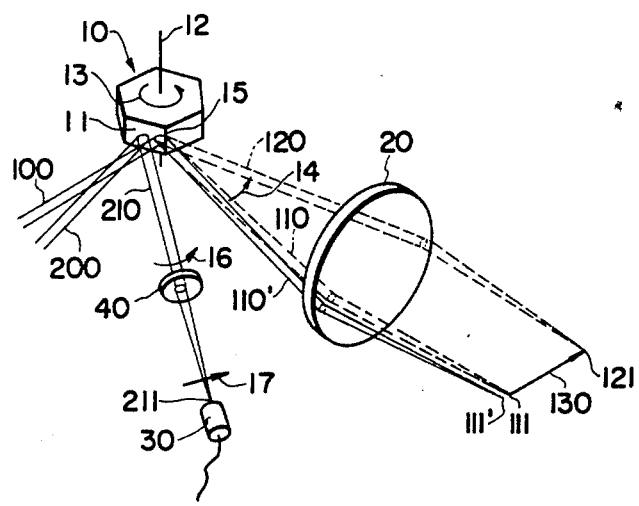
FIG. 2 shows a schematic perspective view of a synchronizing signal generator according to the present invention.

In FIG. 2, wherein identical elements are designated by the same reference numerals as in FIG. 1, it is assumed that the rotary, multi-surfaced mirror 10 is at a rotation angle immediately before the effective scan deflection. In this case, a light beam 100 applied to a mirror surface 11 is reflected to form a light beam 110', which is focused through a lens 20 into a light spot 111' on the scanning plane immediately before the start point 111 of the effective or information scan line 130. The light beam 100 is partially incident on the edge 15 of the mirror surface 11, and part of the light beam is thus not reflected by the surface 11. Accordingly, the light spot 111' undergoes a loss of power, and its shape is irregular. When the mirror 10 is at this rotation angle, a synchronizing signal generating light beam 200 is applied to the reflecting surface 11 which simultaneously forms the light spot 111' by reflecting the light beam 100 from its leading edge, to thereby form a reflected light beam 210 which is focused into a light spot 211 through a lens 40. The beam 200 stikes the mirror surface at a position in advance of the scanning beam, i.e., around the circumference of the mirror in a direction opposite the rotational direction of the mirror. A photo-detector 30 is disposed at the position of the light spot 211 to detect the synchronizing signal generating light beam 200, and the output of the photo-detector is employed as the synchronizing signal.

After the generation of the synchronizing signal the mirror 10 is rotated about the shaft 12 in the direction of the arrow 13, and the light beam 100 reflected by the mirror surface 11 arrives at the position of the light beam 110 and is focused into a light spot 111 on the scanning plane by the lens 20. This is the start point of the information scan. As the mirror is further rotated the reflected light beam 100 continues on to the position of the light beam 120 which is focused into a light spot 121 on the scanning plane, to thus complete a full information line scan.

The fact that the light spot 211 of the synchronizing signal generating beam 200 and the light spot 111' of the beam 100 are always in synchronization with each other, regardless of angle division errors or which mirror surface reflects these beams, will now be described. The light beams 100 and 200 are always applied at speed positions and with a constant angular relationship to the same reflecting surface of the mirror 10 at all times. Therefore, the angular difference between the reflected light beams 110 and 210 is always the same as the constant angular difference between the two input beams. Accordingly, even if there is an angle division error between the various mirror surfaces, the light spots 211 and 111' are in synchronization with each other at all times as they are reflected by the same mirror surface. This is a significant advantage which cannot be obtained when the synchronizing signal generating light beam 200 and the light beam 100 are applied to different mirror surfaces.

According to the present invention when the synchronizing signal generating light beam 200 is detected it is not applied to the edge of a mirror surface, and the light spot 211 focused on the photo-detector is thus not irregular and its shape does not fluctuate between successive mirror surfaces. Accordingly, the trailing edge of the signal produced by the photo-detector is in correspondence to the fixed position of the light beam 110' or the light spot 111' at all times. If the information scan is commenced at this time instant or after the lapse of a suitable predetermined period of time, the start point 111 will always be at the same fixed position and jitter will be eliminated.

The synchronizing signal generating beam 200 may be obtained from the light source of the scanning beam 100, or from a different light source. If the scanning beam 100 for recording information is the first order diffraction light of an acousto-optical modulator, then the zeroth order diffraction light beam can be employed as the synchronizing signal beam.

FIG. 2 shows the focusing lens 40 disposed in the light path of the reflected beam 210. The lens 40 may also be disposed in the light path of the input beam 200, however, in which case the photo-detector 30 would be disposed at the position where the light spot 211 is formed.

The reflected light beam 210 is deflected in the direction of the arrow 16 as the mirror is rotated in the direction of the arrow 13, and the light spot 211 is simultaneously moved in the direction of the arrow 17. Accordingly, if a knife edge is disposed perpendicular to the direction of movement of the light spot in front of the photo-detector, the trailing edge of the synchronizing signal can be positively and accurately obtained. Commencing the information scan with such a synchronizing signal can be effected in accordance with a variety of well known electronic techniques.

With a 24-surfaced mirror the mean synchronization accuracy obtained by the conventional generating technique illustrated in FIG. 1 is 0.4 dot. In contrast therewith, the mean synchronization accuracy obtained by the signal generating technique according to the present invention, as illustrated in FIG. 2, is 0.2 dot.

The angle between beams 100 and 200 may be set at any appropriate value, even 0°, provided that the beams strike the mirror surface(s) at spaced positions such that when light spot 111' is formed by beam 100 impinging the leading edge of the rotating mirror surface 11, the light spot 211 is simultaneously formed at the location or position of the photo-detector 30 by beam 200 impinging the same mirror surface.

What is claimed is:

1. A method for generating a synchronizing signal for a light beam scanner including a rotary, multi-surfaced mirror, comprising:
    (a) directing a first, scanning beam of light at a surface of the mirror for reflection and deflection thereby,
    (b) directing a second, synchronizing signal generating beam of light at the same surface of the mirror for reflection and deflection thereby,
    (c) said second beam of light striking said mirror surface at a position in advance of said first beam of light, and
    (d) detecting the presence of the reflected and deflected second beam of light at a first predetermined position corresponding in time to the presence of the reflected and deflected first beam of light at a second predetermined position in the vicinity of the start point of an information scan line, whereby the detection output constitutes a synchronizing signal.

2. A method as defined in claim 1, wherein the first and second beams of light are oriented at a predetermined angle with respect to one another.

3. A method as defined in claim 1 wherein the reflected and deflected second beam of light is detected at a time said first beam of light impinges on the leading edge of said mirror surface.

4. An apparatus for generating synchronizing signals for a light beam scanner including a rotary, multi-surfaced mirror comprising:
    (a) means for directing a first, scanning beam of light at a surface of the mirror for reflection and deflection thereby,
    (b) means for directing a second, synchronizing signal generating beam of light at the same surface of the mirror for reflection and deflection thereby,
    (c) said second beam of light striking said mirror surface at a position in advance of said first beam of light, and
    (d) means for detecting the presence of the reflected and deflected second beam of light at a first predetermined position corresponding in time to the presence of the reflected and deflected first beam of light at a second predetermined position in the vicinity of the start point of an information scan line, whereby the detecting means output constitutes a synchronizing signal.

5. An apparatus as defined in claim 4, wherein the first and second beams of light are oriented at a predetermined angle with respect to one another.

6. An apparatus as defined in claim 5, further comprising separate lenses for focusing the first and second beams of light, wherein the detecting means comprises a photo-detector, and wherein the first predetermined position is angularly spaced from the second predetermined position, relative to the mirror, by an amount substantially equal to the angular spacing between the first and second light beams and in advance of the second predetermined position with respect to the direction of rotation of the mirror.

7. An apparatus as defined in claim 4, further comprising separate lenses for focusing the first and second beams of light, wherein the detecting means comprises a photo-detector, and wherein the first predetermined position is angularly spaced from the second predetermined position, relative to the mirror, by an amount substantially equal to the angular spacing between the first and second light beams and in advance of the second predetermined position with respect to the direction of rotation of the mirror.

8. An apparatus as claimed in claim 4 wherein said means for detecting is positioned to detect said reflected and deflected second beam of light in time coincidence with said first beam of light impinging on the leading edge of said mirror surface.

* * * * *